United States Patent
Walls et al.

(10) Patent No.: US 11,067,693 B2
(45) Date of Patent: Jul. 20, 2021

(54) SYSTEM AND METHOD FOR CALIBRATING A LIDAR AND A CAMERA TOGETHER USING SEMANTIC SEGMENTATION

(71) Applicant: Toyota Research Institute, Inc., Los Altos, CA (US)

(72) Inventors: Jeffrey M. Walls, Ann Arbor, MI (US); Ryan W. Wolcott, Ann Arbor, MI (US)

(73) Assignee: Toyota Research Institute, Inc., Los Altos, CA (US)

( * ) Notice: Subject to any disclaimer, the term of this patent is extended or adjusted under 35 U.S.C. 154(b) by 440 days.

(21) Appl. No.: 16/033,289

(22) Filed: Jul. 12, 2018

(65) Prior Publication Data
US 2020/0018852 A1    Jan. 16, 2020

(51) Int. Cl.
*G01S 17/00* (2020.01)
*G01S 17/86* (2020.01)
*G01S 7/497* (2006.01)
*G01S 17/08* (2006.01)
*G06K 9/32* (2006.01)
*G06T 7/50* (2017.01)
*G01S 17/89* (2020.01)
*G01S 17/931* (2020.01)

(52) U.S. Cl.
CPC ............ *G01S 17/86* (2020.01); *G01S 7/4972* (2013.01); *G01S 17/08* (2013.01); *G01S 17/89* (2013.01); *G01S 17/931* (2020.01); *G06K 9/3241* (2013.01); *G06T 7/50* (2017.01); *G06T 2207/10028* (2013.01)

(58) Field of Classification Search
USPC ........................................................ 356/5.01
See application file for complete search history.

(56) References Cited

U.S. PATENT DOCUMENTS

| | | | |
|---|---|---|---|
| 9,134,402 B2 * | 9/2015 | Sebastian ................ | G01S 17/58 |
| 9,201,424 B1 | 12/2015 | Ogale | |
| 9,476,983 B2 | 10/2016 | Zeng | |
| 9,734,419 B1 | 8/2017 | Ye et al. | |
| 9,916,703 B2 * | 3/2018 | Levinson ............... | G01S 7/4972 |
| 10,885,664 B1 * | 1/2021 | Schmidt ............ | B64D 45/0005 |
| 2010/0157280 A1 | 6/2010 | Kusevic et al. | |
| 2015/0138310 A1 | 5/2015 | Fan et al. | |
| 2015/0160332 A1 | 6/2015 | Sebastian et al. | |
| 2016/0018524 A1 * | 1/2016 | Zeng ..................... | G01S 17/931 |
| | | | 356/4.01 |
| 2016/0249039 A1 * | 8/2016 | Tran ........................ | G06T 5/50 |

(Continued)

*Primary Examiner* — James R Hulka
(74) *Attorney, Agent, or Firm* — Christopher G. Darrow; Darrow Mustafa PC

(57) ABSTRACT

System, methods, and other embodiments described herein relate to calibrating a light detection and ranging (LiDAR) sensor with a camera sensor. In one embodiment, a method includes controlling i) the LiDAR sensor to acquire point cloud data, and ii) the camera sensor to acquire an image. The point cloud data and the image at least partially overlap in relation to a field of view of a surrounding environment. The method includes projecting the point cloud data into the image to form a combined image. The method includes adjusting sensor parameters of the LiDAR sensor and the camera sensor according to the combined image to calibrate the LiDAR sensor and the camera sensor together.

20 Claims, 9 Drawing Sheets

(56) References Cited

U.S. PATENT DOCUMENTS

| | | | |
|---|---|---|---|
| 2017/0104980 A1* | 4/2017 | Tran | H04N 13/189 |
| 2017/0124781 A1 | 5/2017 | Douillard et al. | |
| 2017/0371348 A1* | 12/2017 | Mou | G01S 17/86 |
| 2018/0031422 A1* | 2/2018 | Murphy | G01J 3/0264 |
| 2019/0004533 A1* | 1/2019 | Huang | G06K 9/4628 |
| 2019/0004534 A1* | 1/2019 | Huang | G05D 1/0088 |
| 2019/0012808 A1* | 1/2019 | Mou | G01S 7/4817 |
| 2019/0120947 A1* | 4/2019 | Wheeler | G01S 17/42 |
| 2019/0122378 A1* | 4/2019 | Aswin | G06T 5/003 |
| 2019/0122386 A1* | 4/2019 | Wheeler | G01S 7/4817 |
| 2019/0353791 A1* | 11/2019 | Vignard | G01S 17/931 |
| 2020/0209401 A1* | 7/2020 | Motoyama | G01S 17/931 |
| 2020/0282929 A1* | 9/2020 | Kroeger | G06T 7/80 |

\* cited by examiner

SYSTEM AND METHOD FOR CALIBRATING A LIDAR AND A CAMERA TOGETHER USING SEMANTIC SEGMENTATION

TECHNICAL FIELD

The subject matter described herein relates, in general, to a system and method for calibrating a LIDAR and a camera together, and, more particularly, to calibrating the sensors together by correlating a camera image with point cloud data through the use of using semantic segmentation to identify corresponding elements that can be matched between the separate data.

BACKGROUND

Vehicles may be equipped with sensors that facilitate perceiving other vehicles, obstacles, pedestrians, and additional aspects of a surrounding environment. For example, a light detection and ranging (LIDAR) sensor uses light to scan the surrounding environment, while logic associated with the LIDAR analyzes acquired data to detect a presence of objects and other features of the surrounding environment. In further examples, additional sensors such as cameras may be implemented along with the LIDAR so that the multiple sensors can be employed in a combined effort to acquire information about the surrounding environment from which a system can identify aspects of the surrounding environment. The combined data can be useful in various circumstances for improving perceptions of the surrounding environment so that systems such as autonomous driving systems can perceive the noted aspects and accurately plan and navigate accordingly.

In general, an associated system may fuse the separate sensor data of the camera and the LiDAR together so that the systems processing the sensor data can do so in a streamlined manner. Thus, to provide the sensor data in this way, the camera and the LiDAR are registered or calibrated together so that the data is aligned or otherwise coordinated between the two sensors. However, over time or as the result of various events, the sensors can experience drift and/or other variations within different sensor parameters. The variations can cause, for example, misalignments between the sensors that result in sensor data with intrinsic errors. Consequently, realized declines in sensor data quality can influence an ability of the vehicle to perceive the surrounding environment and, thus, influence an ability of the vehicle to navigate autonomously and/or employ advanced driver assistance systems.

Moreover, a process of calibrating the sensors together can be complex and generally uses specialized instrumentation. For example, some calibration processes may use particular preconfigured patterns that provide markers generated for the separate sensors at predefined locations. Thus, the system calibrates the sensors together through awareness of the locations of the predefined markers in the perceived sensor data. However, the use of such calibration devices means that the driver must, for example, either have the calibration device on-hand or schedule the calibration with a service center. In either case, calibrating the sensors in this manner interrupts the use of the vehicle, and, moreover, if unable to perform the calibration because of an inability to schedule service or because the calibration device is otherwise inaccessible, systems of the vehicle could be offline for extended periods. Accordingly, the noted approach to calibrating a LiDAR sensor and a camera together can be generally inefficient.

SUMMARY

In one embodiment, example systems and methods relate to a manner of improving calibration of a LiDAR sensor and a camera together using perceived aspects of a surrounding environment to perform the calibration on-the-fly. Thus, the disclosed approach exploits characteristics of the sensor data using semantic segmentation to identify correlations between the sensor data of the separate sensors (e.g., varying depths associated with objects having different semantic labels). In one embodiment, a disclosed system computes errors in a combined image according to the noted correlations. The system can then, for example, adjust sensor parameters to correct the error and thereby calibrate the sensors. In this way, the disclosed systems and methods avoid the use of purpose-built calibration devices and, therefore, improve the calibration of the sensors together through providing for dynamic calibration of the sensors on-demand.

In one embodiment, a calibration system for calibrating a light detection and ranging (LiDAR) sensor with a camera sensor is disclosed. The calibration system includes one or more processors and a memory communicably coupled to the one or more processors. The memory stores an acquisition module including instructions that when executed by the one or more processors cause the one or more processors to control i) the LiDAR sensor to acquire point cloud data, and ii) the camera sensor to acquire a camera image. The point cloud data and the camera image at least partially overlap in relation to a field of view of a surrounding environment. The memory stores an adjustment module including instructions that when executed by the one or more processors cause the one or more processors to project the point cloud data into the camera image to form a combined image. The adjustment module includes instructions to adjust sensor parameters of the LiDAR sensor and the camera sensor according to the combined image to calibrate the LiDAR sensor and the camera sensor together.

In one embodiment, a non-transitory computer-readable medium for calibrating a light detection and ranging (LiDAR) sensor with a camera sensor and including instructions that when executed by one or more processors cause the one or more processors to perform one or more functions. The instructions include instructions to control i) the LiDAR sensor to acquire point cloud data, and ii) the camera sensor to acquire a camera image. The point cloud data and the camera image at least partially overlap in relation to a field of view of a surrounding environment. The instructions include instructions to project the point cloud data into the camera image to form a combined image. The instructions include instructions to adjust sensor parameters of the LiDAR sensor and the camera sensor according to the combined image to calibrate the LiDAR sensor and the camera sensor together.

In one embodiment, a method for calibrating a light detection and ranging (LiDAR) sensor with a camera sensor disclosed. In one embodiment, a method includes controlling i) the LiDAR sensor to acquire point cloud data, and ii) the camera sensor to acquire an image. The point cloud data and the image at least partially overlap in relation to a field of view of a surrounding environment. The method includes projecting the point cloud data into the image to form a combined image. The method includes adjusting sensor parameters of the LiDAR sensor and the camera sensor according to the combined image to calibrate the LiDAR sensor and the camera sensor together.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
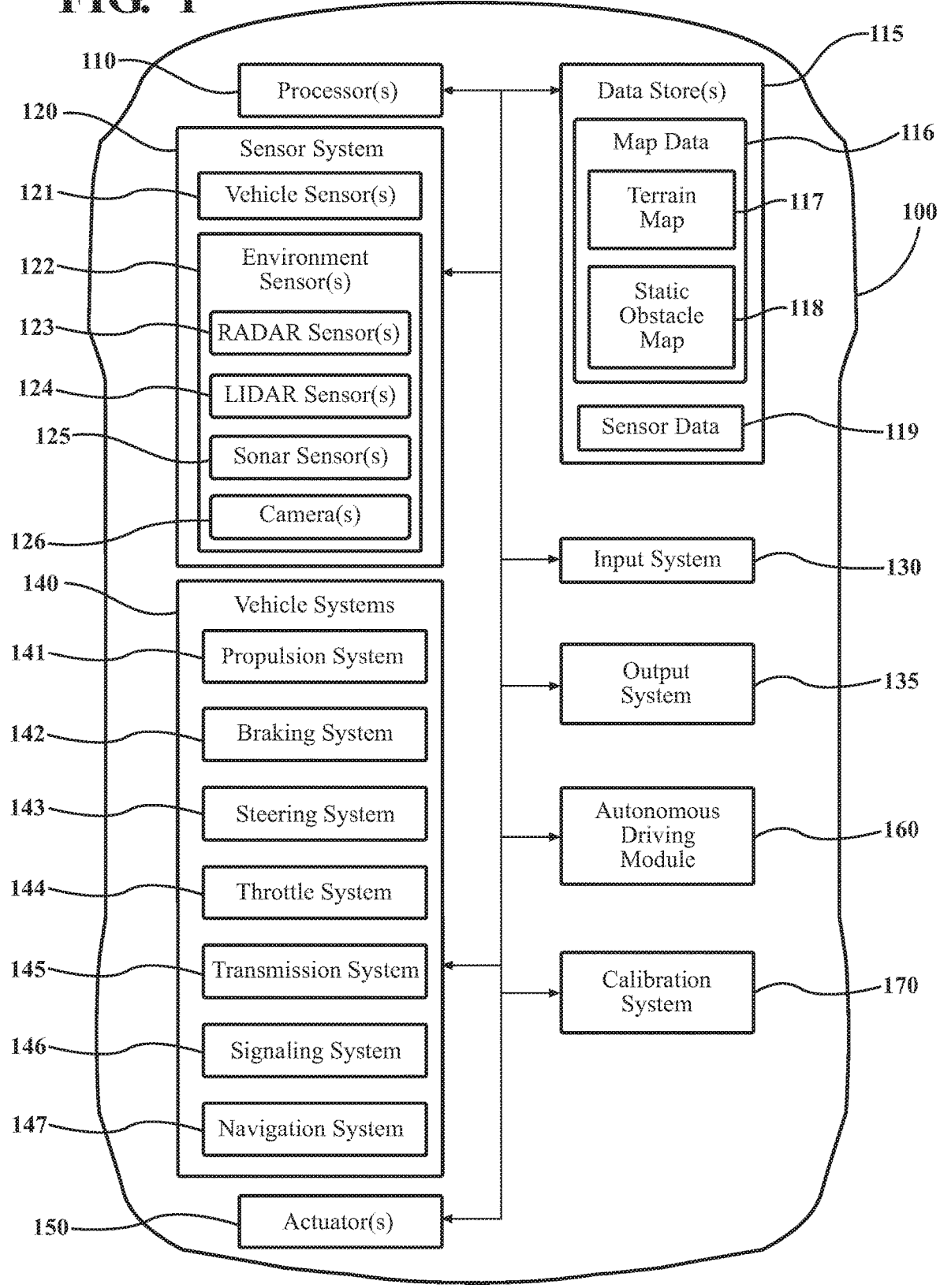
FIG. 1 illustrates one embodiment of a vehicle within which systems and methods disclosed herein may be implemented.

Systems, methods, and other embodiments associated with a manner of dynamically calibrating sensors using semantic segmentation to correlate aspects of sensor data are disclosed. As mentioned previously, a vehicle may include multiple sensors for perceiving aspects of the surrounding environment. Moreover, autonomous driving systems or other systems within the vehicle process sensor data from the sensors to perceive aspects of the surrounding environment. However, in general, when the noted sensors lose calibration/registration, resulting fused sensor data can become unreliable. Moreover, calibrating the sensors together in order to correct calibration errors traditionally relies on a calibration process that uses specialized calibration devices or other inefficient processes thereby resulting in difficulties with re-calibrating sensors in a timely manner, which may cause various systems in a vehicle to be offline for extended periods of time.

Therefore, in one embodiment, a calibration system and associated methods as disclosed herein provide for calibrating sensors together dynamically and on-demand by using semantic segmentation to correlate aspects of the sensor data. For example, the disclosed calibration system may be implemented within a vehicle that includes a LiDAR sensor, a camera, and further sensors as may be implemented to support systems of the vehicle such as an autonomous driving module or other driving assistance system. The autonomous driving module uses the sensor data to detect obstacles, and otherwise perceive aspects of the surrounding environment in support of, for example, autonomously navigating the vehicle. Accordingly, the autonomous driving module can utilize the sensor data from the separate sensors in a fused form that generally relies on the sensors being registered or calibrated together such that the sensor data is aligned within areas with overlapping observations.

To achieve this calibration, the sensor parameters associated with the separate sensors, in one embodiment, generally define a transformation that indicates respective orientations and translations between the sensors. Thus, when the vehicle combines the sensor data from the two sensors, the transformation provides for how the two sets of sensor data are aligned. However, as the sensors drift out of calibration, the transformation may no longer accurately aligns the sensor data. Accordingly, the disclosed calibration system, in one embodiment, dynamically calibrates the sensors together by adjusting the sensor parameters.

The calibration system executes the calibration process by, for example, initially controlling the LiDAR sensor and the camera to acquire sensor data. Of course, the LiDAR sensor produces the sensor data in the form of a point cloud whereas the camera generates an electronic image. The calibration system then separately analyzes the image and the point cloud to identify characteristics within each. For the camera image, the calibration system analyzes the image using a semantic segmentation function that generates semantic labels for the separate object instances within the image. By generating the semantic labels, the calibration system identifies on a per-pixel level which aspects of the image correlate with different objects embodied therein. Accordingly, the calibration system, in one embodiment, also analyzes the point cloud data to identify characteristics of the objects therein such as regions of discontinuity and/or variances in depth that may generally correlate with edges of the objects.

Thus, the calibration system can project the point cloud data into the image to generate combined sensor data according to the transformation. However, because of the sensor's lack of calibration, an error exists in the alignment between the two data sets. Thus, the calibration system identifies this error by comparing the objects within the image according to the semantic labels and the identified characteristics corresponding to objects in the point cloud data. The calibration system can then correct the error by adjusting the sensor parameters and thereby calibrating the sensors together. In this way, the calibration system improves the calibration process by providing for on-demand calibration that is dynamically executed using sensor data acquired from the surrounding environment.

Referring to FIG. 1, an example of a vehicle 100 is illustrated. As used herein, a "vehicle" is any form of motorized transport. In one or more implementations, the vehicle 100 is an automobile. While arrangements will be described herein with respect to automobiles, it will be understood that embodiments are not limited to automobiles. In some implementations, the vehicle 100 may be any robotic device or form of motorized transport that, for example, includes sensors to perceive aspects of the surrounding environment, and thus benefits from the functionality discussed herein.

The vehicle 100 also includes various elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances.

Some of the possible elements of the vehicle 100 are shown in FIG. 1 and will be described along with subsequent figures. However, a description of many of the elements in FIG. 1 will be provided after the discussion of FIGS. 2-9 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

In either case, the vehicle 100 includes a calibration system 170 that is implemented to perform methods and other functions as disclosed herein relating to calibrating multiple sensors together such as LiDAR sensors and cameras. The noted functions and methods will become more apparent with a further discussion of the figures.

Figure 2:
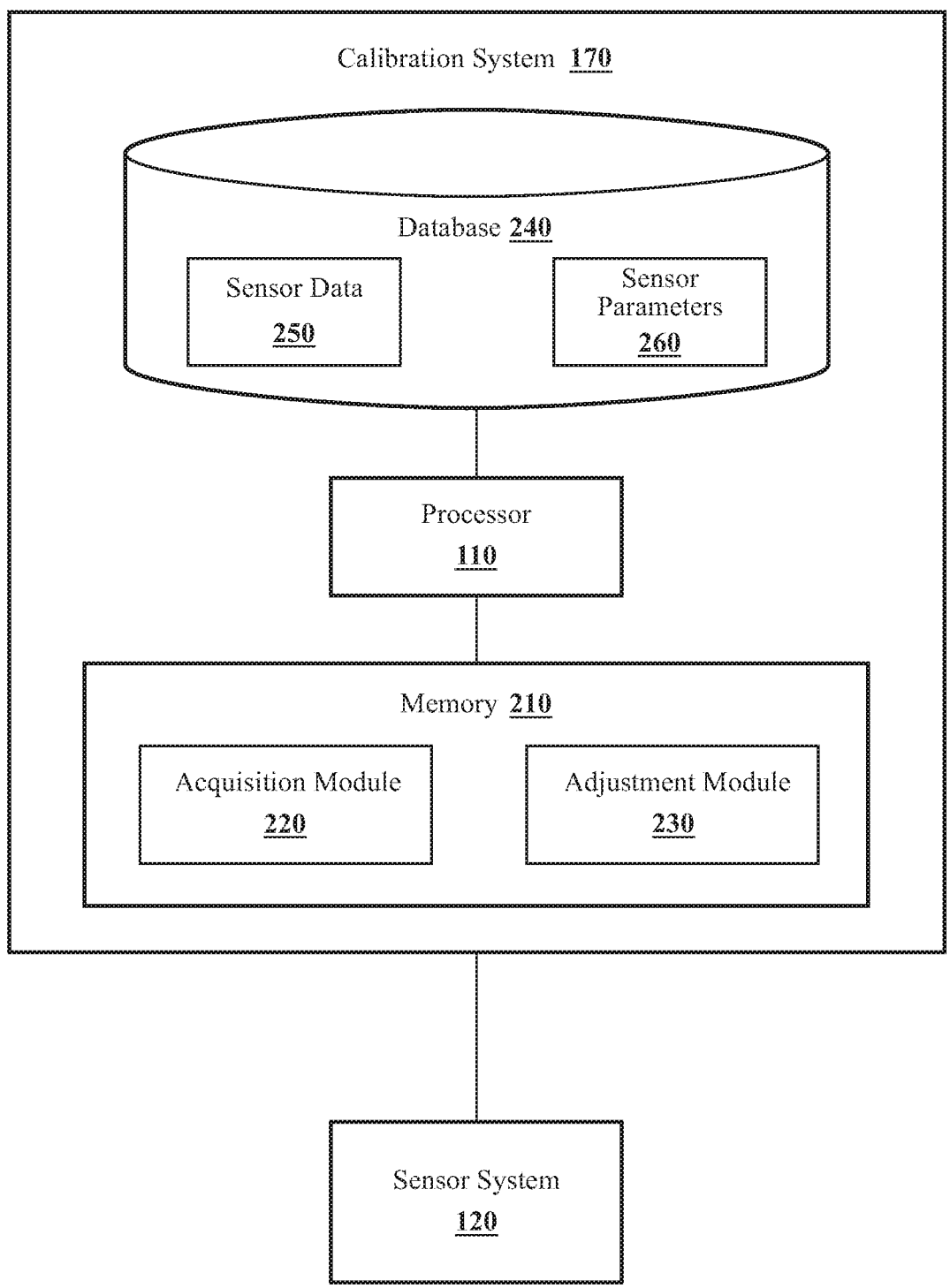
FIG. 2 illustrates one embodiment of a calibration system that is associated with dynamically calibrating a LiDAR sensor and a camera together according to semantic labels.

With reference to FIG. 2, one embodiment of the calibration system 170 of FIG. 1 is further illustrated. The calibration system 170 is shown as including a processor 110 from the vehicle 100 of FIG. 1. Accordingly, the processor 110 may be a part of the calibration system 170, the calibration system 170 may include a separate processor from the processor 110 of the vehicle 100 or the calibration system 170 may access the processor 110 through a data bus or another communication path. In one embodiment, the calibration system 170 includes a memory 210 that stores an acquisition module 220 and an adjustment module 230. The memory 210 is a random-access memory (RAM), read-only memory (ROM), a hard-disk drive, a flash memory, or other suitable memory for storing the modules 220 and 230. The modules 220 and 230 are, for example, computer-readable instructions that when executed by the processor 110 cause the processor 110 to perform the various functions disclosed herein.

Accordingly, the acquisition module 220 generally includes instructions that function to control the processor 110 to receive data inputs from sensors of the vehicle 100 that are to be registered/calibrated together. The present discussion will focus on a calibration process between the LiDAR 124 and the camera 126; however, it should be appreciated that the disclosed approach can be extended to cover further configurations of sensors such as multiple LiDAR sensors with one or more cameras, different types of LiDARs and cameras, and so on. Accordingly, the acquisition module 220, in one embodiment, controls the respective sensors to provide the data inputs in the form of the sensor data 250. As an additional note, while the acquisition module 220 is generally discussed as controlling the various sensors to provide the sensor data 250, in one or more embodiments, the acquisition module 220 can employ other techniques to acquire the sensor data 250 that are either active or passive. For example, the acquisition module 220 may passively sniff the sensor data 250 from a stream of electronic information provided by the various sensors to further components within the vehicle 100. The sensor data 250 is, in one embodiment, scan data that embodies observations of a surrounding environment of the vehicle 100. In general, as provided for herein, the acquisition module 220 receives the sensor data 250 from the respective sensors and can either proceed with the calibration process on-the-fly or store the sensor data 250 for subsequent calibrations.

Furthermore, in one embodiment, the calibration system 170 includes the database 240. The database 240 is, in one embodiment, an electronic data structure stored in the memory 210 or another data store and that is configured with routines that can be executed by the processor 110 for analyzing stored data, providing stored data, organizing stored data, and so on. Thus, in one embodiment, the database 240 stores data used by the modules 220 and 230 in executing various functions. In one embodiment, the database 240 includes sensor data 250 along with, for example, other information that is used by the modules 220 and 230 such as the sensor parameters 260. Of course, in further embodiments, the sensor parameters 260 are stored within the respective sensors themselves within hardware registers of the respective sensors or another suitable location as may be individually implemented according to the sensor.

The sensor data 250 can include 3D point cloud data along with, for example, metadata describing additional characteristics about the acquired point cloud data such as a location, a time/day, and so on. The sensor data 250, in one embodiment, further includes camera images and/or video from the camera 126 along with similar metadata as described in relation to the point cloud data. In further embodiments, the sensor data 250 includes information from further sensors (e.g., an IMU) that may be used to perform various tasks (e.g., motion blur correction) in support of the processes noted herein.

The acquisition module 220, in one embodiment, is further configured to perform additional tasks beyond controlling the respective sensors to acquire and provide the sensor data 250. For example, the acquisition module 220 analyzes the sensor data 250 that is to be used for calibrating in order to identify information therein that is applied in support of the calibration. In one embodiment, the acquisition module 220 generates semantic labels for a camera image. As used herein, semantic segmentation refers to a process by which images are analyzed to understand the images at the pixel level. In other words, the acquisition module 220 analyzes an image according to a semantic segmentation technique such that each pixel within the image is identified as belonging to a separate object that is represented in the image. By way of example, the acquisition module 220 processes an image by identifying the separate objects within the image and annotating each pixel associated with the separate objects using a semantic label associated therewith. Thus, for an image that includes a roadway scene, the acquisition module 220 separately labels pixels associated with a road, a vehicle, a curb, a sidewalk, and so on. In this way, the acquisition module 220 distinguishes between separate aspects represented within the whole image and boundaries between each.

In one embodiment, the acquisition module 220 includes a neural network (e.g., convolutional neural network) that processes the image to generate the semantic labels. In further implementations, the acquisition module 220 implements different approaches for performing the semantic segmentation which can include deep convolutional encoder-decoder architectures, a multi-scale context aggregation approach using dilated convolutions, or another suitable approach that generates the semantic labels for the separate object classes represented in the image. Whichever particular approach the acquisition module 220 implements, the acquisition module 220 provides the image as an output with semantic labels identifying an associated object for the pixels within the image. In this way, the calibration system 170 distinguishes between the objects and boundaries between the objects. As an additional note, while the aspects of the image are broadly discussed, in various embodiments, the acquisition module 220 can identify and distinguish between aspects within the image with varying degrees of granularity. For example, depending on a resolution of the camera, a particular semantic segmentation approach that is implemented, and other implementation factors, the acquisition module 220 can distinguish between broad categories (e.g., street, car, landscaping, etc.) to finer categories (e.g., baseball, plants, etc.) of information.

By providing the ability to distinguish between boundaries of the objects with a reasonable degree of certainty, the acquisition module 220 provides the calibration system 170 with the ability to leverage characteristics of the point cloud data so that the point cloud data can be correlated with the labeled camera image. For example, the acquisition module 220 further analyzes the point cloud data to identify distinguishing aspects within the data. In one or more aspects, the acquisition module 220 analyzes the point cloud data to identify discontinuities in depth information corresponding to edges of objects, general differences in depths between different areas to identify separate objects overall, or other suitable characteristics that correlate with objects such that positions of the objects can be identified. In further aspects, the acquisition module 220 analyzes the point cloud data to identify patterns within the data points that correlate with different types of surfaces (e.g., different intensities of detected returns). Moreover, the acquisition module 220, in one embodiment, analyzes the point cloud data using a semantic segmentation model for point cloud data. Thus, the acquisition module 220 generates labels of object instances depicted within the point cloud data as a manner of identifying objects that may correlate with objects depicted in the camera images. In general, the acquisition module 220 can implement various approaches to analyzing the point cloud data to characterize the different objects embodied therein; however, as discussed within the present disclosure emphasis is provided in relation to the identification of edges and variations in depth to identify the objects from which the adjustment module 230 can identify correlations, as subsequently discussed.

In one embodiment, the adjustment module 230 generally includes instructions that function to control the processor 110 to project the point cloud data into the camera image to generate a combined image. In one embodiment, the process of projecting the point cloud data into the camera image occurs according to extrinsic parameters of the sensor parameters 260 that define the transformation between the sensors. That is, as previously described, the sensor parameters 260 include extrinsic parameters defining a relationships between data produced by the respective sensors. In one embodiment, the extrinsic parameters indicate transformations for an orientation and a translation between data provided by the respective sensors. The noted sensor parameters 260 provide for the adjustment module 230 and other systems that fuse the data from the sensors to combine the respective sensor data together in an aligned manner.

Thus, the adjustment module 230 projects the point cloud data into the camera image according to the defined transformation. Errors that are present in the combined image between the two sets of data are a result of, in general, inaccuracies within the transformation and/or other intrinsic parameters of the sensors. Accordingly, the adjustment module 230, in one embodiment, identifies the error by comparing the identified characteristics within the point cloud data with the corresponding labeled areas within the camera image. By way of example, the adjustment module 230 compares an edge of an object identified within the point cloud data with the same edge as identified in the camera image according to the image semantic labels. In various embodiments, the adjustment module 230 approximates the edges through a process of interpolation or other suitable approximation and then performs a best-fit comparison to verify correspondence. Of course, in further aspects, the adjustment module 230 can be implemented to execute the comparison without approximating the edges and instead using identified point features or other characteristics that can be identified and correlated between the point cloud data and the semantic labels of the camera image. For example, in one approach where semantic labels are available for both sets of data in the combined image, the adjustment module 230 performs the noted comparison using semantic labels from the separate data sets. Thus, the adjustment module 230, in one embodiment, directly correlates object instances depicted in the combined image using semantic labels.

From the knowledge of which characteristics/objects correlate within the combined image, the adjustment module 230 generates the error. In one embodiment, the adjustment module 230 generates the error according to an absolute comparison (i.e., directionally agnostic) in order to acquire a general amplitude of mismatch between the point cloud data and the camera image. In further aspects, the adjustment module 230 undertakes a finer granularity of comparison to determine the error across different regions of the combined image and in relation to the components of the transformation (i.e., orientation and translation). Moreover, in further aspects, the adjustment module 230 determines error in the combined image in relation to intrinsic sensor parameters of the sensors such as focal length, and so on. The adjustment module 230 determines the error in the intrinsic parameters according to, for example, patterns within the identified error from the comparison.

In either case, the adjustment module 230 adjusts the sensor parameters 260 in order to correct the identified error. In one embodiment, the adjustment module 230 determines how to adjust the sensor parameters 260 by using a lookup table of correction values where the error is provided as an input into the lookup table. In various approaches, the adjustment module 230 may implement the lookup table as a multi-dimensional table that accepts separate error values for the various sensor parameters (e.g., orientation and translation). In further embodiments, the adjustment module 230 implements an active approach to determining values for correcting the sensor parameters 260. For example, the adjustment module 230 executes a search algorithm over the sensor parameters 260 to adjust the sensor parameters 260 and correct for the error. The adjustment module 230, in one approach, implements a local search (i.e., hill climb search), a continuous optimization (e.g., Bayesian optimization), or another suitable search functionality to select correcting values for the sensor parameters 260.

Thus, the adjustment module 230 may calibrate the sensors together over multiple iterations of acquiring the sensor data and determining the error. That is, in one embodiment, the adjustment module 230 initiates a search over the sensor parameters 260 using an initial guess of a correcting value according to the identified error. Thereafter, the calibration system 170 executes the calibration process again with the adjusted sensor parameters 260. Thus, in such an approach, the acquisition module 220 re-acquires the sensor data 250 and re-generates the combined image. The adjustment module 230 can then determine the error according to the adjusted sensor parameters 260 and, if the error is not within a threshold variance, then further adjust the sensor parameters 260 and continue to perform the calibration process until the threshold variance is satisfied. In this way, the calibration system 170 calibrates the LiDAR sensor and the camera together dynamically using characteristics of the sensor data itself. Consequently, the disclosed calibration process improves over other approaches by providing a robust mechanism that can be employed without the need for specialized devices thereby supporting continued calibration of the sensors and realizing improved accuracy as a result.

Figure 3:
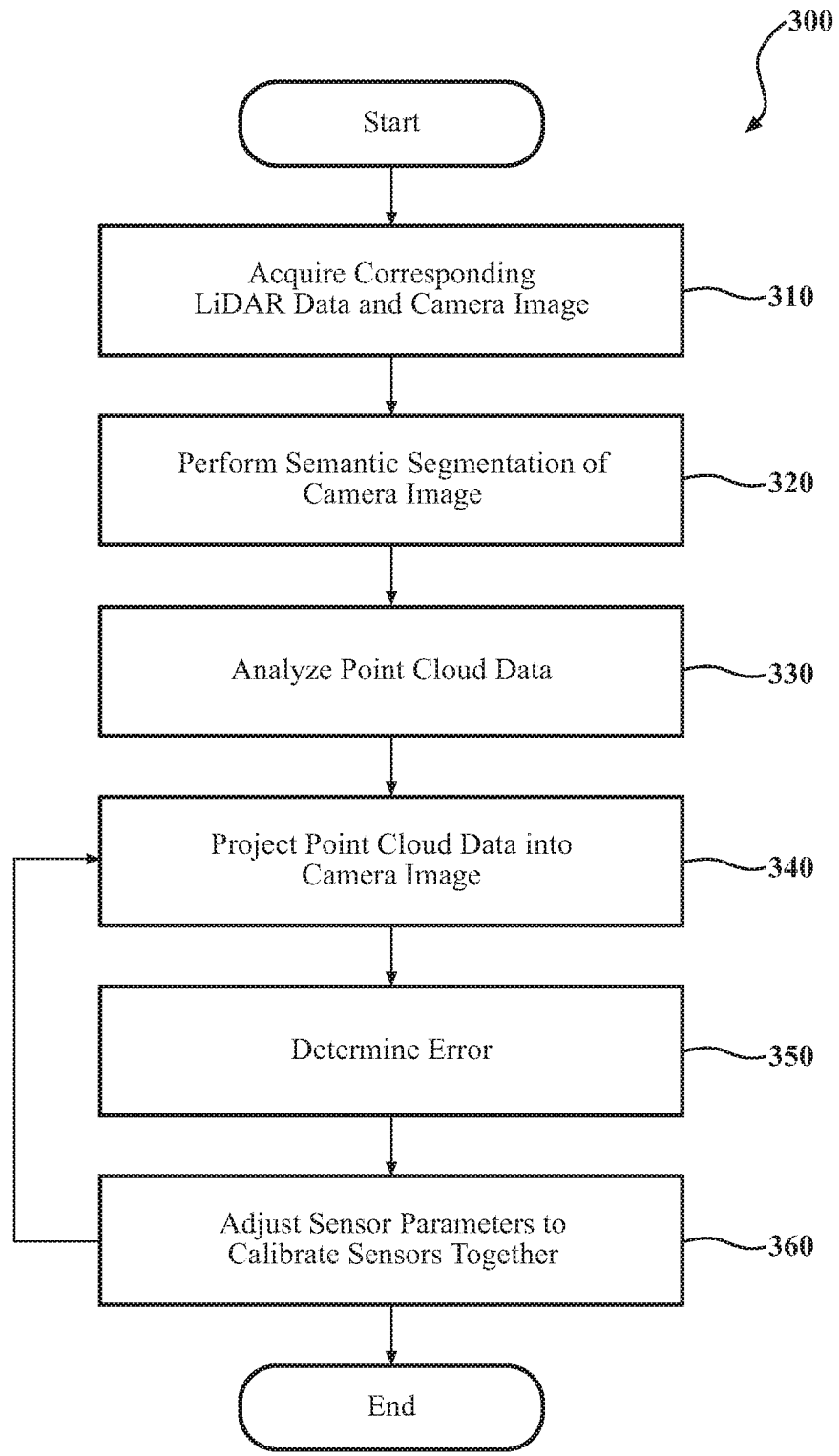
FIG. 3 illustrates one embodiment of a method associated with using semantic segmentation to provide for dynamically calibrating multiple sensors together.

Additional aspects of dynamically calibrating multiple sensors together will be discussed in relation to FIG. 3. FIG. 3 illustrates a flowchart of a method 300 that is associated with using semantic segmentation to support a dynamic calibration process. Method 300 will be discussed from the perspective of the calibration system 170 of FIGS. 1, and 2. While method 300 is discussed in combination with the calibration system 170, it should be appreciated that the method 300 is not limited to being implemented within the calibration system 170, but is instead one example of a system that may implement the method 300.

At 310, the acquisition module 220 controls the LiDAR sensor 124 and the camera 126 of the vehicle 100 to observe the surrounding environment. As part of controlling the sensors to acquire the sensor data 250, it is generally understood that the sensors acquire the sensor data 250 of a same region with the surrounding environment so that the sensor data 250 includes overlap of a field of view between the camera image and the point cloud data. In one embodiment, the sensor data 250 may include only partial overlap between the camera image and the point cloud data. In general, the sensor data 250 need not be of the exact same bounded region in the surrounding environment but should include a sufficient area of overlap such that distinct aspects of the area can be correlated for the calibration process. Thus, the acquisition module 220, in one embodiment, controls the sensors to acquire the sensor data 250 of the same area, or alternatively selectively acquires the sensor data 250 from a data stream such that the acquired data is of the same region or is at least is partially overlapping.

Moreover, in further embodiments, the acquisition module 220 controls the sensors to at least semi-continuously acquire the sensor data 250 such that successive iterations of the discussed calibration process may be undertaken. Thus, the calibration system 170, in one embodiment, iteratively executes the functions discussed at blocks 310-360 to acquire the scan data 250 and provide information therefrom. Furthermore, the acquisition module 220, in one embodiment, executes one or more of the noted functions in parallel for separate observations in order to maintain updated perceptions.

At 320, the acquisition module 220 identifies objects within the camera image on a per pixel basis by analyzing the image according to a semantic segmentation algorithm. In one embodiment, the acquisition module 220 applies the semantic segmentation algorithm to annotate pixels of the image with semantic labels associated with objects represented therein. The process of annotating the image results in, for example, each pixel of the image having a semantic label that associates the pixel with an object instance depicted therein. While the acquisition module 220 is generally discussed as labeling each pixel to correspond with an associated object, the granularity of the semantic segmentation may vary according to a particular implementation. That is, the acquisition module 220 may broadly associate the pixels with primary features of the image (e.g., sky, road, building, car, etc.) or, in further aspects, the acquisition module 220 annotates the pixels according to a more absolute fine-grained representation that accounts for greater detail by representing curbs, sidewalks, signs, posts, individual trees, and so on. In this way, the calibration system 170 delineates between aspects of the camera image to provide awareness of the separate aspects such that comparisons between the camera image and the point cloud data become more intuitive.

At 330, the acquisition module 220 analyzes the point cloud data to identify characteristics that are indicative of objects embodied therein. As indicated in relation to the previous discussion, the acquisition module 220 processes the point cloud data to identify characteristics therein that are indicative of objects and aspects associated with the objects. Accordingly, the adjustment module 230, in one embodiment, comparatively analyzes the varying depths within the point cloud data that correspond with observations in the surrounding environment. In general, the adjustment module 230 uses the knowledge that differences in depth from one portion of the point cloud data to another portion indicates the presence of different aspects of the surrounding environment.

For example, the acquisition module 220 processes the point cloud data to identify areas of discontinuity where the data points abruptly shift in distances. These types of discontinuities generally correlate with edges of objects since an adjacent point may be of a considerably different distance when beyond an object. Thus, the acquisition module 220 can identify such points and then correlate the points to identify edges of objects. In a similar fashion, the acquisition module 220 can additionally, or alternatively, group data points according to varying distances such that points corresponding to a particular distance within a same area are identified as corresponding with the same object. Of course, in further embodiments, the acquisition module 220 includes one or more machine learning functions that process the point cloud data according to the noted principles and/or further aspects in order to identify the objects therein.

At 340, the adjustment module 230 projects the point cloud data into the camera image to form a combined/projected image. In one embodiment, the adjustment module 230 computes the combined image using a transformation between the point cloud data and the camera image according to at least the sensor parameters 260. That is, the adjustment module 230 uses information about an orientation and a translation between the camera image and the point cloud data to provide the combined image as a fused form of the two sets of data. The transformation generally provides for indicating how the disparate sets of data are to be aligned. Thus, when the sensors are within calibration tolerances, the resulting combined image exhibits a strong degree of correlation between the two sets of sensor data. However, when the sensors are not in calibration errors in alignment are likely present.

At 350, the adjustment module 230 determines the error in alignment in the combined image. In one embodiment, the adjustment module 230 correlates the identified characteristics of the point cloud data with the semantic labels to determine the error. Thus, as previously detailed, the adjustment module compares corresponding points from the image and the point cloud data as represented within the combined image to determine a difference in position between the two. The adjustment module 230 can characterize the differences as a single overall error or as discrete errors associated with different ones of the sensor parameters 260. Moreover, the adjustment module 230 can generate the error in a localized form within separate areas of the region to characterize inconsistencies in the combined image. In either case, the adjustment module 230 determines the error in order to provide for adjusting the sensor parameters 260 to calibrate the sensors together.

At 360, the adjustment module 230 adjusts the sensor parameters 260 of the LiDAR sensor 124 and the camera sensor 126. In one embodiment, the adjustment module 230 adjusts the sensor parameters 260 by an extent that corresponds with the error. The particular manner of how the adjustment module 230 changes the sensor parameters 260 can vary according to the particular implementation; however, it should be appreciated that the adjustment module 230 modifies the sensor parameters 260 in order to correct for the error and calibrate the sensors together. Thus, as previously indicated the adjustment module 230 may execute a search over the possible sensor parameters for the sensors which is initiated according to the determined error. Moreover, the adjustment module 230 can further execute the search in an iterative manner by iteratively modifying the sensor parameters 260 and determining the error for subsequent combined images until the error satisfies a threshold variance.

In one approach, the adjustment module 230 adjusts the sensor parameters at 360 according to the determined error and then cycles back to projecting the camera image into the point cloud at 340 and repeating the process with the adjusted parameters, as shown in FIG. 3. In this way, the adjustment module 230 iteratively performs the adjustment over the acquired information until the parameters converge.

In one embodiment, the threshold variance is an acceptable amount of offset/error within the combined image. The threshold variance may be indicated according to each of the separate sensor parameters 260, as an overall combined permitted error, or in another suitable form. In general, the threshold variance is selected according to an amount of disconformity within the alignment that is permissible according to the application for which the combined image is provided. That is, when employed as a manner of perceiving the environment to autonomously navigate, the threshold variance may be indicated as a relatively low tolerance (i.e., close alignment), whereas when employed as a manner of displaying data to passengers for entertainment purposes the threshold variance may be less constrained.

Furthermore, while the calibration system 170 is generally discussed as performing the method 300 when the sensors are to be calibrated, in different embodiments, the calibration system 170 may continually perform the calibration process as the sensors are functioning in order to ensure that the provided information stays within specified tolerances. Alternatively, or additionally, the calibration system 170 can be initiated to perform the method 300 upon request by other vehicle systems through an electronic request to the calibration system 170, by manual request initiated via a driver, a service technician, or other concerned party electronically initiating the calibration process. In either case, the disclosed calibration process is unmarried from particular devices and locations since dynamically acquired sensor data is used to perform the calibration process on-demand.

Figure 4:
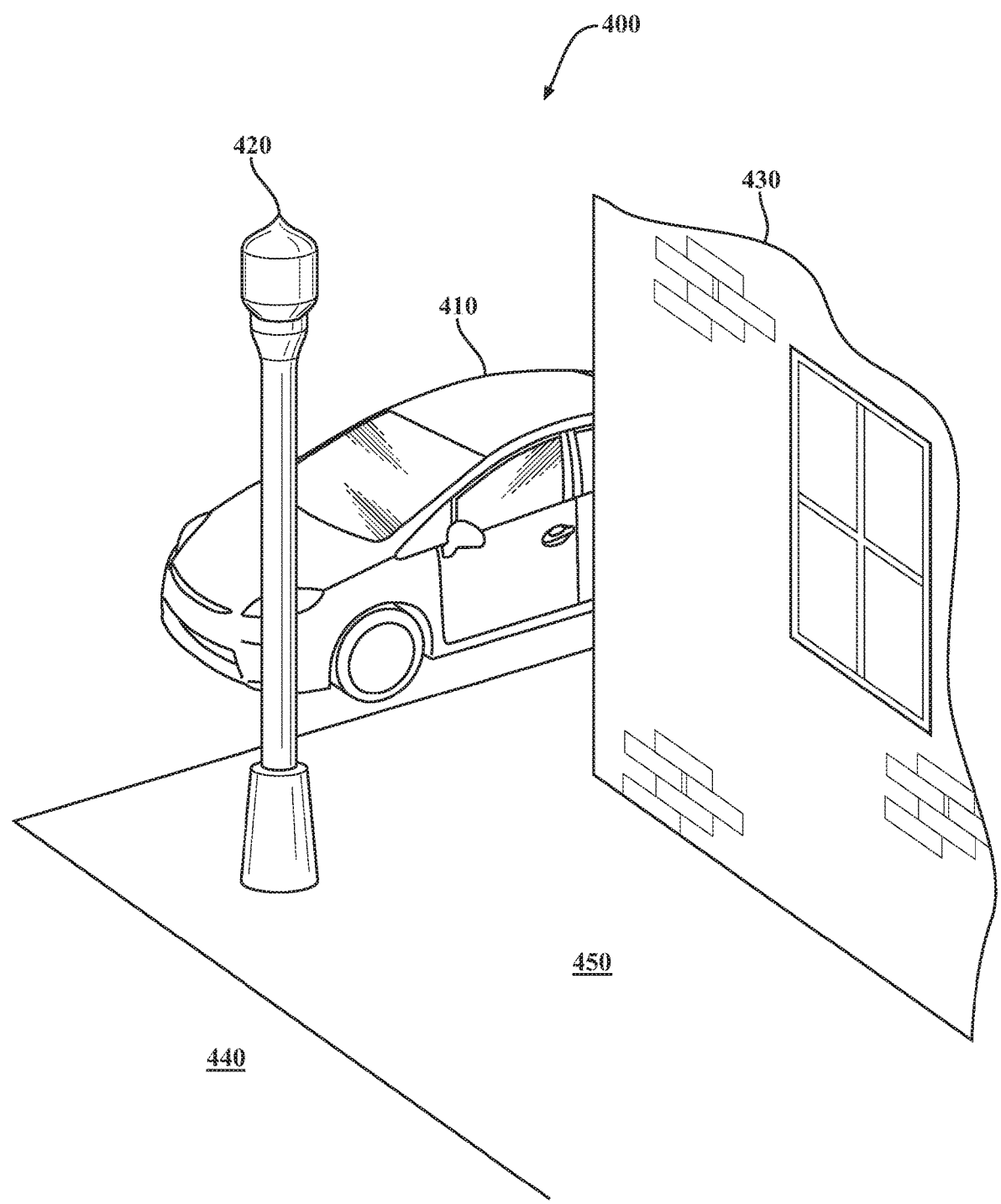
FIG. 4 illustrates one example of a camera image as may be captured by a camera sensor.
Figure 5:
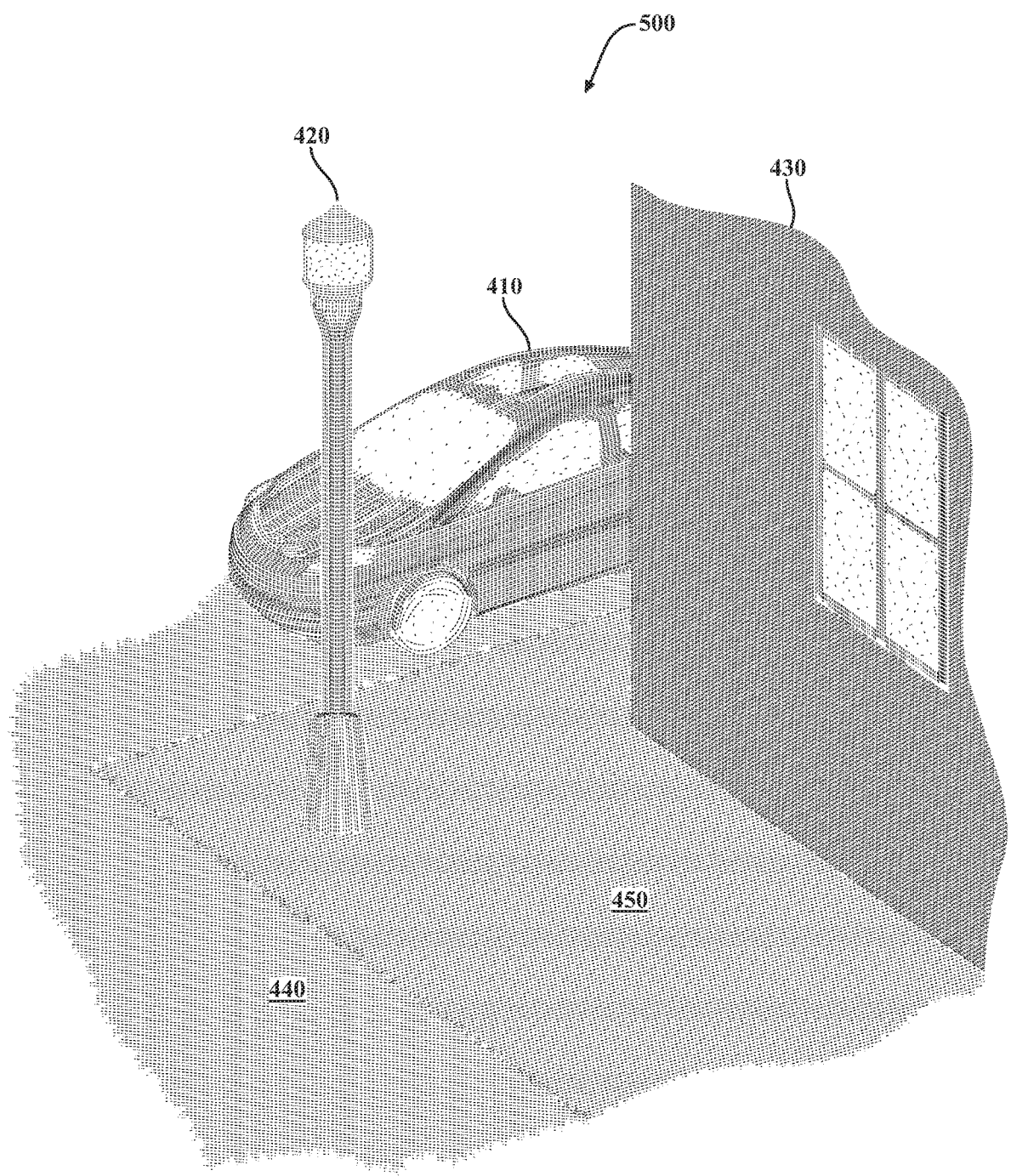
FIG. 5 illustrates one example of a point cloud representing the same region depicted by the camera image of FIG. 4.

As a further explanation of how the calibration system 170 improves the process of calibrating a LiDAR sensor and a camera sensor together, consider FIG. 4. FIG. 4 illustrates an example camera image 400 of a surrounding environment as may be captured by the camera sensor 126 from the vehicle 100. Accordingly, the image 400 depicts a vehicle 410, a light post 420, a building corner 430, a road 440, and a sidewalk 450. Similarly, in combination with acquiring the image 400, the acquisition module 220 also acquires a point cloud 500 as depicted in FIG. 5. As shown, the point cloud 500 includes an overlapping observation of the same area depicted within the camera image 400.

Figure 6:
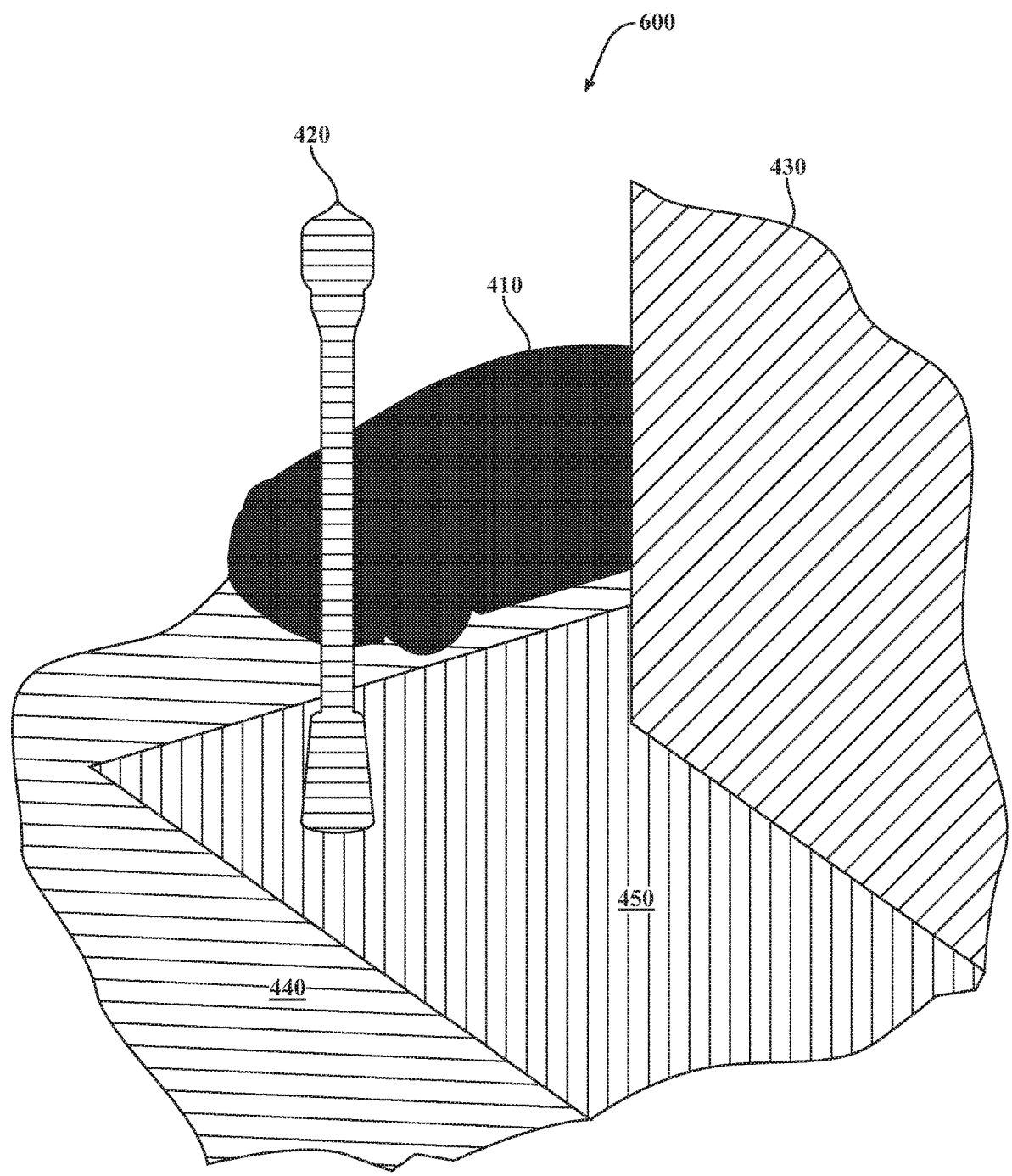
FIG. 6 illustrates one example of a process of semantic segmentation applied to the image 400 of FIG. 4 to generate semantic labels.

Upon acquiring the image 400 and the point cloud 500, the acquisition module 220, in one embodiment, analyzes the point cloud 500 to identify characteristics of the point cloud 500 from which objects may be distinguished. Accordingly, the acquisition module 220, in one example, analyzes the point cloud 500 for discontinuities in depth between proximately situated data points in order to identify edges of objects. Thus, as shown, the acquisition module 220 may detect the light pole 420 through identifying changes in depth from the pole 420 to the car 410 or other aspects of the background. In a similar manner, the acquisition module 220 can distinguish the building 430, the car, and so on. FIG. 6 depicts a semantically annotated image 600 derived from the image 400 from FIG. 4. That is, as depicted in FIG. 6, the image 600 is segmented according to processing by the acquisition module 220 using a semantic segmentation algorithm. Accordingly, the separate object instances depicted in the image 600 are the result of being annotated with semantic labels by the acquisition module 220. Thus, although the image 600 as provided does not illustrate specific pixels, pixels that are a part of the image 600 have been assigned to the separate object instances present therein using the semantic labels as illustrated.

Figure 7:
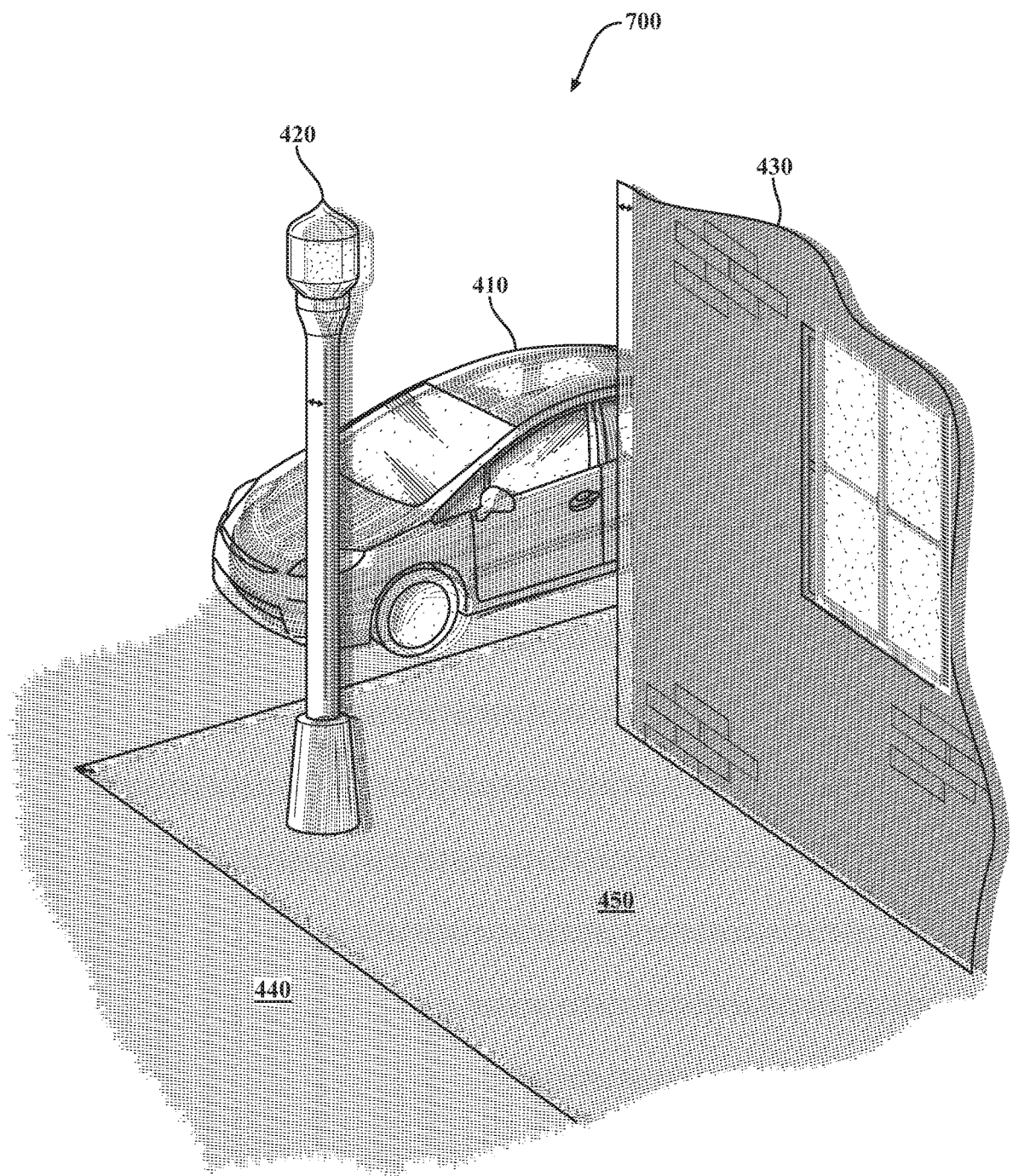
FIG. 7 depicts a projection of the point cloud from FIG. 5 onto the image of FIG. 4 to produce a combined image.

FIG. 7 depicts a combined image 700 formed by the adjustment module 230 projecting the point cloud 500 into the image 400. As shown in the combined image 700, the point cloud data is offset from the camera image. This offset is a result of a miscalibration within the sensor parameters 260, which the adjustment module 230 uses in order to generate the combined image 700. The offset embodies the error as noted along with the discussion of block 350 of FIG. 3.

Figure 8:
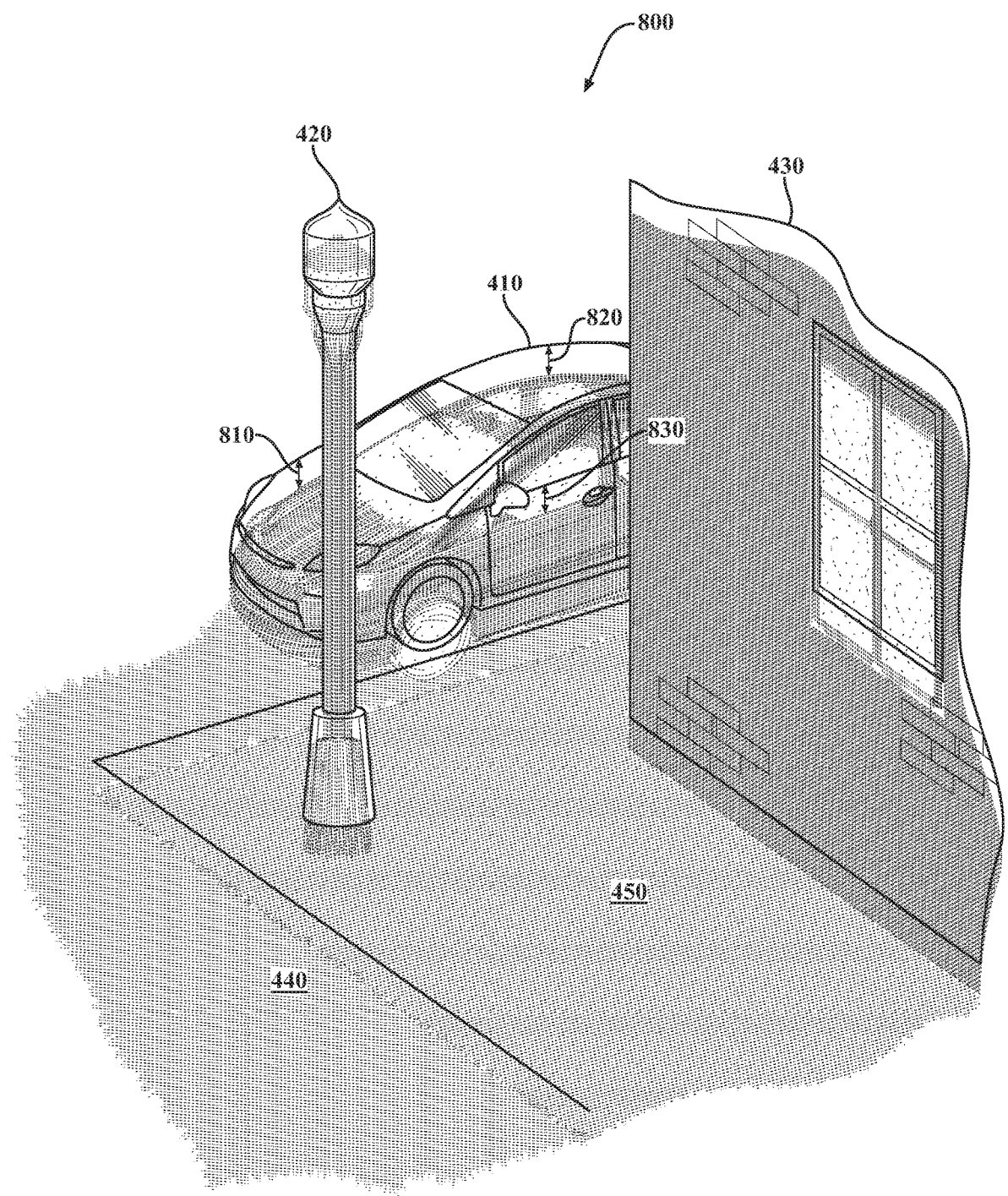
FIG. 8 illustrates one example of misalignments between a point cloud and a camera image.
Figure 9:
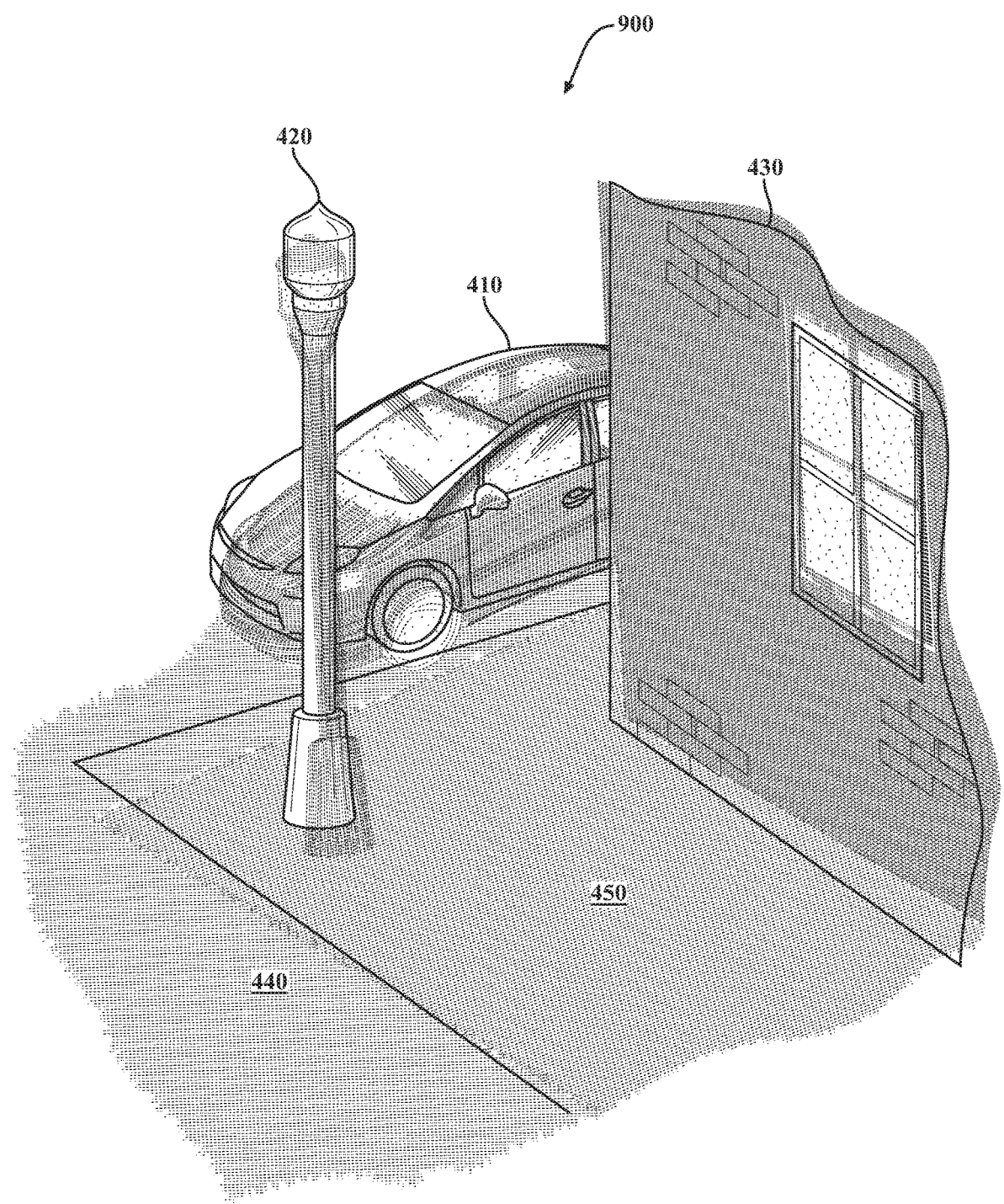
FIG. 9 illustrates one example of multiple different misalignments in a combined image.

FIG. 8 further depicts the combined image 700. As illustrated, the offsets 810, 820, and 830 are exaggerated for purposes of illustrating how the separate sets of data may be misaligned. In either case, the adjustment module 230 identifies corresponding points/features within the two sets of data within the combined image 700 and determines the error/offset therebetween as illustrated in the view 800. The view 800 generally illustrates a translational shift in a single direction between the two sets of data. FIG. 9 depicts a separate view 900 of the vehicle 410 in a further combined image. As shown in FIG. 9, the two data sets include both errors in translation parameters and orientation parameters as is evident from the differences in the offsets for different corresponding features. Accordingly, the adjustment module 230 determines the offsets/error and can proceed with adjusting the respective parameters to calibrate the sensors together as discussed in relation to FIGS. 2 and 3.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner, now known or later developed. "Manual mode" means that all of or a majority of the navigation and/or maneuvering of the vehicle is performed according to inputs received from a user (e.g., human driver). In one or more arrangements, the vehicle 100 can be a conventional vehicle that is configured to operate in only a manual mode.

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangements, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras or infrared (IR) cameras.

The vehicle 100 can include an input system 130. An "input system" includes any device, component, system, element or arrangement or groups thereof that enable information/data to be entered into a machine. The input system 130 can receive an input from a vehicle passenger (e.g., a driver or a passenger). The vehicle 100 can include an output system 135. An "output system" includes any device, component, or arrangement or groups thereof that enable information/data to be presented to a vehicle passenger (e.g., a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The processor(s) 110, the calibration system 170, and/or the autonomous driving module(s) 160 can be operatively connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110, the calibration system 170, and/or the autonomous driving module(s) 160 may control some or all of these vehicle systems 140 and, thus, may be partially or fully autonomous.

The processor(s) 110, the calibration system 170, and/or the autonomous driving module(s) 160 can be operatively connected to communicate with the various vehicle systems 140 and/or individual components thereof. For example, returning to FIG. 1, the processor(s) 110, the calibration system 170, and/or the autonomous driving module(s) 160 can be in communication to send and/or receive information from the various vehicle systems 140 to control the movement, speed, maneuvering, heading, direction, etc. of the vehicle 100. The processor(s) 110, the calibration system 170, and/or the autonomous driving module(s) 160 may control some or all of these vehicle systems 140.

The processor(s) 110, the calibration system 170, and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110, the calibration system 170, and/or the autonomous driving module(s) 160 can control the direction and/or speed of the vehicle 100. The processor(s) 110, the calibration system 170, and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 either independently or in combination with the calibration system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source such as determinations from the sensor data 250 as implemented by the adjustment module 230. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-9, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A calibration system for calibrating a light detection and ranging (LiDAR) sensor with a camera sensor, comprising:
   one or more processors;
   a memory communicably coupled to the one or more processors and storing:
      an acquisition module including instructions that when executed by the one or more processors cause the one or more processors to control i) the LiDAR sensor to acquire point cloud data, and ii) the camera sensor to acquire a camera image, wherein the point cloud data and the camera image at least partially overlap in relation to a field of view of a surrounding environment; and
      an adjustment module including instructions that when executed by the one or more processors cause the one or more processors to project the point cloud data into the camera image to form a combined image by computing the combined image using a transformation between the point cloud data and the camera image according to at least sensor parameters, and
      wherein the adjustment module includes instructions to adjust the sensor parameters of the LiDAR sensor and the camera sensor according to the combined image to calibrate the LiDAR sensor and the camera sensor together by using a semantic label associated with an object in the camera image without a calibration marker.

2. The calibration system of claim 1, wherein the acquisition module further includes instructions to identify objects within the camera image on a per pixel basis by analyzing the camera image according to a semantic segmentation algorithm to annotate pixels of the camera image with semantic labels associated with the objects.

3. The calibration system of claim 2, wherein the adjustment module includes instructions to adjust the sensor parameters including instructions to correlate the point cloud data with the semantic labels of the objects within the combined image according to characteristics of the point cloud data that correspond with the semantic labels.

4. The calibration system of claim 2, wherein the adjustment module further includes instructions to analyze the point cloud data to identify characteristics that are indicative of the objects, and
   wherein the adjustment module includes instructions to identify the characteristics including instructions to identify i) varying depths within the point cloud data that correspond with the objects, ii) discontinuities within the point cloud data that correspond with edges of the objects, and iii) semantic labels of object instances depicted in the point cloud data and the camera image.

5. The calibration system of claim 4, wherein the adjustment module includes instructions to correlate the point cloud data with the semantic labels including instructions to determine an error in the combined image between the point cloud data and the camera image using the characteristics in comparison with the objects associated with the semantic labels.

6. The calibration system of claim 1, wherein the adjustment module includes instructions to adjust the sensor parameters including instructions to iteratively adjust the sensor parameters over a plurality of iterations of acquiring the point cloud data and the camera image.

7. The calibration system of claim 1, wherein the sensor parameters include extrinsic parameters that define a correlation between the point cloud data and the camera image, wherein the extrinsic parameters include at least an orientation and a translation between the point cloud data and the camera image, and
   wherein the sensor parameters include intrinsic parameters of the LiDAR sensor and the camera sensor including orientation parameters and translation parameters that define the transformation between the LiDAR sensor and camera sensor.

8. The calibration system of claim 1, wherein the calibration system is integrated within a vehicle to support calibration of the LiDAR sensor and the camera sensor that provide information to an autonomous driving module of the vehicle.

9. A non-transitory computer-readable medium for calibrating a light detection and ranging (LiDAR) sensor with a camera sensor and including instructions that when executed by one or more processors cause the one or more processors to:

control i) the LiDAR sensor to acquire point cloud data, and ii) the camera sensor to acquire a camera image, wherein the point cloud data and the camera image at least partially overlap in relation to a field of view of a surrounding environment;

project the point cloud data into the camera image to form a combined image by computing the combined image using a transformation between the point cloud data and the camera image according to at least sensor parameters; and adjust the sensor parameters of the LiDAR sensor and the camera sensor according to the combined image to calibrate the LiDAR sensor and the camera sensor together by using a semantic label associated with an object in the camera image without a calibration marker.

10. The non-transitory computer-readable medium of claim 9, wherein the instructions further include instructions to identify objects within the camera image on a per pixel basis by analyzing the image according to a semantic segmentation algorithm to annotate pixels of the camera image with semantic labels associated with the objects.

11. The non-transitory computer-readable medium of claim 10, wherein the instructions to adjust the sensor parameters include instructions to correlate the point cloud data with the semantic labels of the objects within the combined image according to characteristics of the point cloud data that correspond with the semantic labels.

12. The non-transitory computer-readable medium of claim 10, wherein the instructions further include instructions to analyze the point cloud data to identify characteristics that are indicative of the objects, and
wherein the instructions to identify the characteristics include instructions to identify one or more of: i) varying depths within the point cloud data that correspond with the objects, ii) discontinuities within the point cloud data that correspond with edges of the objects and iii) semantic labels of object instances depicted in the point cloud data.

13. The non-transitory computer-readable medium of claim 12, wherein the instructions to correlate the point cloud data with the semantic labels include instructions to determine an error in the combined image between the point cloud data and the camera image using the characteristics in comparison with the objects associated with the semantic labels.

14. A method of calibrating a light detection and ranging (LiDAR) sensor with a camera sensor, comprising:
controlling i) the LiDAR sensor to acquire point cloud data, and ii) the camera sensor to acquire a camera image, wherein the point cloud data and the camera image at least partially overlap in relation to a field of view of a surrounding environment;

projecting the point cloud data into the camera image to form a combined image by computing the combined image using a transformation between the point cloud data and the camera image according to at least sensor parameters; and adjusting the sensor parameters of the LiDAR sensor and the camera sensor according to the combined image to calibrate the LiDAR sensor and the camera sensor together by using a semantic label associated with an object in the camera image without a calibration marker.

15. The method of claim 14, further comprising:
identifying objects within the camera image on a per pixel basis by analyzing the image according to a semantic segmentation algorithm to annotate pixels of the camera image with semantic labels associated with the objects.

16. The method of claim 15, wherein adjusting the sensor parameters includes correlating the point cloud data with the semantic labels of the objects within the combined image according to characteristics of the point cloud data that correspond with the semantic labels.

17. The method of claim 15, further comprising:
analyzing the point cloud data to identify characteristics that are indicative of the objects, and wherein identifying the characteristics including instructions to identify i) varying depths within the point cloud data that correspond with the objects, ii) discontinuities within the point cloud data that correspond with edges of the objects and iii) semantic labels of object instances depicted in the point cloud data.

18. The method of claim 16, wherein correlating the point cloud data with the semantic labels includes determining an error in the combined image between the point cloud data and the camera image using the characteristics in comparison with the objects associated with the semantic labels.

19. The method of claim 14, wherein adjusting the sensor parameters includes iteratively adjusting the sensor parameters over a plurality of iterations of acquiring the point cloud data and the camera image.

20. The method of claim 14, wherein the sensor parameters include extrinsic parameters that define a correlation between the point cloud data and the image, wherein the extrinsic parameters include at least an orientation and a translation between the point cloud data and the camera image, and wherein the sensor parameters include intrinsic parameters of the LiDAR sensor and the camera sensor including orientation parameters and translation parameters that define the transformation between the LiDAR sensor and camera sensor.

* * * * *